(12) United States Patent
Saxena et al.

(10) Patent No.: US 7,496,860 B2
(45) Date of Patent: Feb. 24, 2009

(54) ENGINEERING STANDARD WORK FRAMEWORK METHOD AND SYSTEM

(75) Inventors: Vivek Saxena, West Hartford, CT (US); Sriram Srinivasan, Hebron, CT (US); Joseph Adams, S. Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 751 days.

(21) Appl. No.: 10/881,343

(22) Filed: Jun. 30, 2004

(65) Prior Publication Data

US 2006/0005157 A1 Jan. 5, 2006

(51) Int. Cl.
*G06F 3/048* (2006.01)
*G06F 17/50* (2006.01)

(52) U.S. Cl. ............................ 715/853; 715/764; 705/7
(58) Field of Classification Search .................. 715/853
See application file for complete search history.

(56) References Cited

U.S. PATENT DOCUMENTS

| | | | | |
|---|---|---|---|---|
| 5,630,069 | A * | 5/1997 | Flores et al. | 705/7 |
| 6,732,353 | B1 * | 5/2004 | Bloom et al. | 717/103 |
| 7,010,530 | B2 * | 3/2006 | Bartkowiak et al. | 707/9 |
| 7,051,071 | B2 * | 5/2006 | Stewart et al. | 709/204 |
| 7,117,449 | B1 * | 10/2006 | Levin et al. | 715/765 |
| 2003/0018627 | A1 * | 1/2003 | Turner et al. | 707/3 |
| 2003/0152212 | A1 * | 8/2003 | Burok et al. | 379/265.02 |
| 2003/0233631 | A1 * | 12/2003 | Curry et al. | 717/100 |
| 2004/0019541 | A1 * | 1/2004 | William et al. | 705/31 |
| 2004/0225549 | A1 * | 11/2004 | Parker et al. | 705/8 |

OTHER PUBLICATIONS

Purrington, Courtney, et al., "Pratt & Whitney: Engineering Standard Work", Harvard Business School, Jul. 25, 2003, Publication No. N9-109-604-013.
Courtney Purrington and H. Kent Bowen, Pratt & Whitney: Engineering Standard Work, Harvard Business School, N9-109-604-013, Jul. 25, 2003.

* cited by examiner

*Primary Examiner*—Tadesse Hailu
*Assistant Examiner*—Nicholas S Ulrich
(74) *Attorney, Agent, or Firm*—Carlson, Gaskey & Olds (57) ABSTRACT

A method and system for managing complex projects uses a framework having workflow maps containing activity blocks that provide detailed, easily accessible information within the framework about the project. The framework links functional groups, their associated activities, and the dependences between activities. The detailed, prescriptive instructions provided at each stage in the process creates in-process quality control, reducing the likelihood of costly mistakes and turnbacks. Implementing the framework as a web-based application allows easy access to the framework as well as data entered into the framework for future analysis, making it easy to identify improvement opportunities in the framework.

11 Claims, 5 Drawing Sheets

| | A | B | C | D | E | F | G | H | I | J |
|---|---|---|---|---|---|---|---|---|---|---|
| 1 | | BLADES | PHASE: 2 | | | TASK: LABOR (HOURS) | | | | |
| 2 | ORDER | SWIM LANE | # APS | # ACTIVE | | STEP 1 | STEP 2 | STEP 3 | STEP 4 | |
| 3 | | WORK FLOW TOTAL | 453 | 453 | | 602 | 3175 | 4879 | 8656 | |
| 4 | | | | | | | | | | |
| 5 | | | | | | | | | | |
| 6 | | BLADES | PHASE: 2 | | | TASK: LABOR (HOURS) | | | | |
| 7 | ORDER | SWIM LANE | # APS | # ACTIVE | | STEP 1 | STEP 2 | STEP 3 | STEP 4 | |
| 8 | 1 | MD | 61 | 61 | | 110 | 665 | 1280 | 2055 | |
| 9 | 2 | SL | 77 | 77 | | 15 | 862 | 862 | 1739 | |
| 10 | 3 | PD | 28 | 28 | | 0 | 441 | 1047 | 1488 | |
| 11 | 4 | DU | 38 | 38 | | 143 | 455 | 413 | 1011 | |
| 12 | 5 | PR | 54 | 54 | | 53 | 288 | 608 | 949 | |
| 13 | 6 | VL | 17 | 17 | | 180 | 100 | 414 | 694 | |
| 14 | 7 | ME | 24 | 24 | | 80 | 252 | 82 | 414 | |
| 15 | 8 | IC | 39 | 39 | | 5 | | | | |
| 16 | 9 | IE | 11 | 11 | | | | | | |
| | 10 | TA | 22 | | | | | | | |

ENGINEERING STANDARD WORK FRAMEWORK METHOD AND SYSTEM

TECHNICAL FIELD

The present invention relates to work management systems that manage complex processes.

BACKGROUND OF THE INVENTION

Complex projects, such as new product development, require coordination of many organizations and activities to complete the project and to ensure consistent, predictable project execution to obtain high quality the first time the project is executed. To a large extent, product development remains a low yield process because the entire process remains undocumented in most industries. Also, there is currently no existing general framework that allows documentation of both project management and first-time process quality. Incomplete communication among and between project activities may lead to backtracking throughout the process, wasting time and resources. Product development, in particular, often encounters a great deal of reworking and scrapped materials because currently known product development processes are design tool-focused rather than process-focused. In other words, currently known processes simply assign separate responsibilities to different people without showing them how the responsibilities flow together in any cohesive way. The activities in the overall project end up being treated as independent activities with no real formal links among them. The resulting disconnects between the different people involved in the product development process results in a great deal of wasteful rework and scrap when users attempt to mesh their different activities together.

In addition, work flow mapping usually relies on existing organizational structures. As organizational structures evolve, existing work flows become obsolete. Thus, there is a need to document work flows that are independent of organization structures and are instead aligned with standard disciplines and/or functions.

Further, insufficient communication may make it difficult to determine dependencies between activities. For example, one activity may require information from several other activities before proceeding, but due to lack of coordination the information may not be available at the time the activity needs it. Also, a person in one activity may not even know what activities provide needed information or who to contact for that information. As a result, the lack of a detailed, cohesive work flow may slow down product development. This necessitates data exchange templates that capture details of the exact information exchange across activities in work flows.

Moreover, incomplete information within the work management system may create inconsistencies and unpredictability in work results even if communication is adequate. For example, separation of the engineering and manufacturing stages also makes it difficult to ensure that a given design is producible until after the design stage is substantially complete. Also, currently available work flow maps only indicate the activities to be executed, without any details with respect to the actual execution steps (e.g., work instructions, version control of tools, design criteria, preferred/best practices, etc.). This lack of detail leaves open the possibility of differing interpretations and/or execution of a given activity, makes it difficult to ensure predictability and consistency in the work results. While it is possible to conduct quality control during a design and/or product review, these reviews are often conducted after the design and/or product are well on their way to completion. Thus, correction of any errors requires extensive backtracking, further wasting resources. Ideally, product development incorporates in-process quality control in addition to stage-gate product review based quality control, but there is currently no known mechanism for in-process quality control.

There is a desire for a system that can improve workflow in a complex process by improving communication and coordination of activities within the process while at the same time providing details on how to execute the activities with templates on work instructions, tools and methods, design criteria, and design standards.

SUMMARY OF THE INVENTION

The following invention addresses the above-mentioned shortcomings of currently known product development methodologies while setting a framework for in-process quality control.

Generally, the present invention is directed to a method and system for managing complex processes to ensure predictable, consistent execution to obtain high quality results in the first instance. A framework according to one embodiment of the invention includes workflow maps having activity blocks arranged by functional swimlanes, which cluster activities together into functional groups that assign ownership of the activities to different organizations. Each activity block is linked to its corresponding supporting documents in template form (e.g., work instructions, tools and methods, design criteria, design standards, etc.), which provide detailed, easily accessible information within the framework about the project.

In one embodiment, the framework includes detailed work instructions associated with each activity to provide information on how to execute the activities in the map, tools and methods to be used during activity execution, design criteria used to evaluate whether a given activity was performed successful, design standards that integrate design and execution (e.g., engineering and manufacturing functions) to ensure that the designs are by definition producible, a lessons learned element to allow continuous improvement of the framework, and a practitioner proficiency element that dictates whether expert supervision and/or approval is needed for a given activity.

The detailed project flow map provided by the framework links functional groups, their associated activities, and the dependences between activities. The flow map provides an easily-understood visual map of the entire process and adds robust connectivity between activities as well as the functional groups and people conducting those activities. The detailed, prescriptive instructions provided at each stage in the process creates in-process quality control, reducing the likelihood of costly mistakes and turnbacks. Further, by implementing the framework as a web-based application, framework users can monitor and access framework resources as well as compare actual results to target results, making it easy to identify improvement opportunities within the process.

DETAILED DESCRIPTION OF THE EMBODIMENTS

Generally, a standard work process framework 100 according to the invention provides a structure to drive a complex project via process control. The framework 100 may include periodic gated reviews during the process in addition to inspection of an end result and can also provide a way to conduct controlled experimentation and improvement. The framework 100 also provides a structure for documenting designs that have worked before to provide a base for further experimentation with improvements. By providing clear, prescriptive details on the engineering tasks within a process (e.g., content, sequence, timing, information flow, dependences between activities, quality checks, etc.), the framework 100 makes it difficult to conceal shortcomings in engineer skills, methodologies, and/or causality between problems and outcome within unaccounted variations in the design process.

Figure 1:
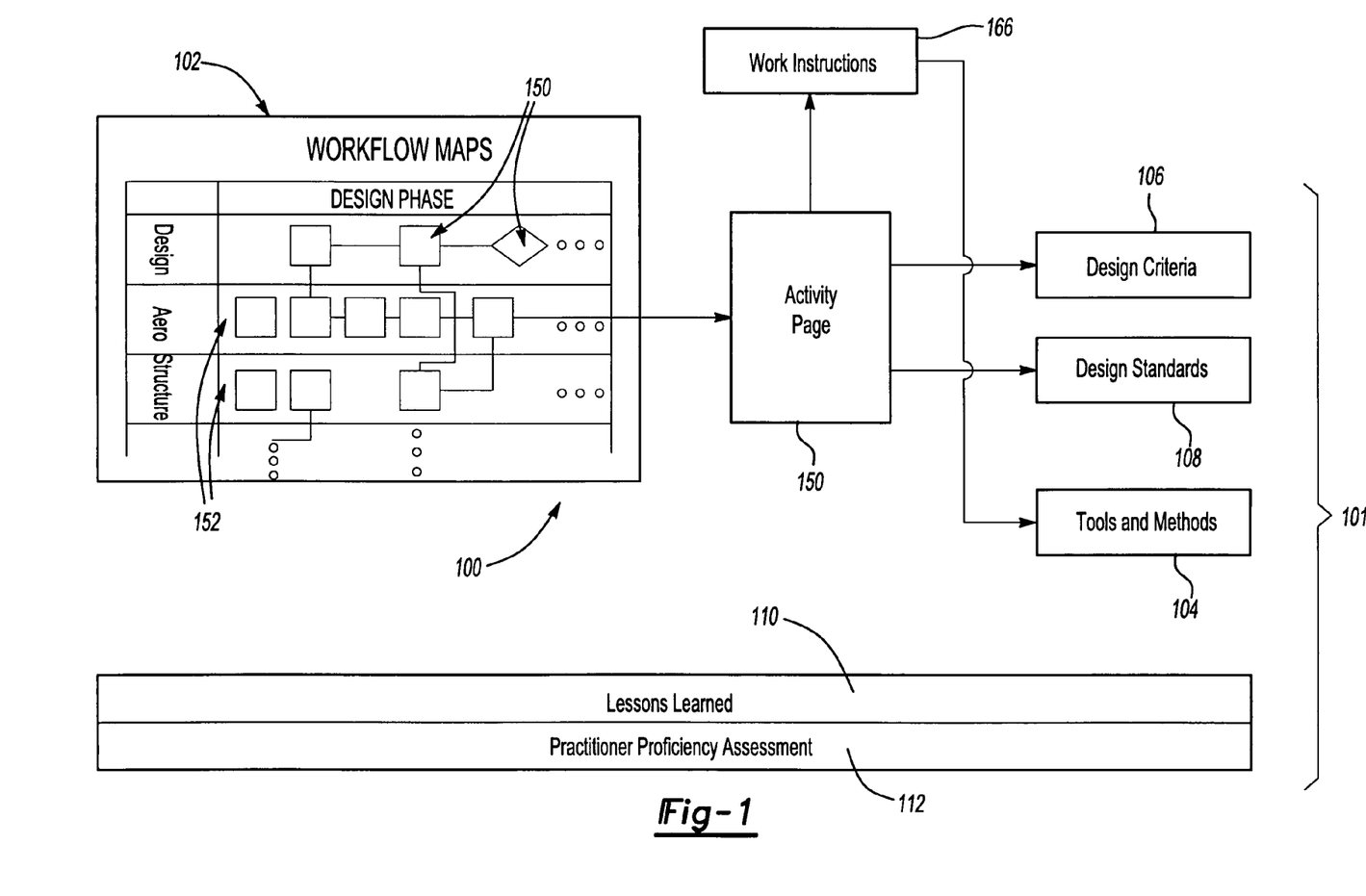
FIG. 1 is a representative block diagram illustrating elements in a standard work framework using functional swimlanes according to one embodiment of the invention.

Referring to FIG. 1, the standard work framework 100 according to one embodiment of the invention may, for example, be a web-implemented software system that can be applied to any complex process having defined inputs and/or requirements resulting in expected outputs and/or products. Normally, the details of the process are invisible to the people involved in the project because their focus tends to be on their own specific activities. The framework 100 provides a broader perspective on the project for everyone involved. Further, by incorporating processes for all aspects of planning, use, sustaining, and compliance with standard work, the framework 100 ensures repeatable and flawless execution of the processes.

In the illustrated example, the framework 100 contains six main elements 101. Each element 101 may have an associated owner that is responsible for approving any changes made to the standard work framework 100. The elements 101 themselves dictate the tasks needed to complete an activity in an element 101, criteria for determining whether the work was done correctly and whether the outcome is defect-free, and a course of action if defects are detected.

Figure 2:
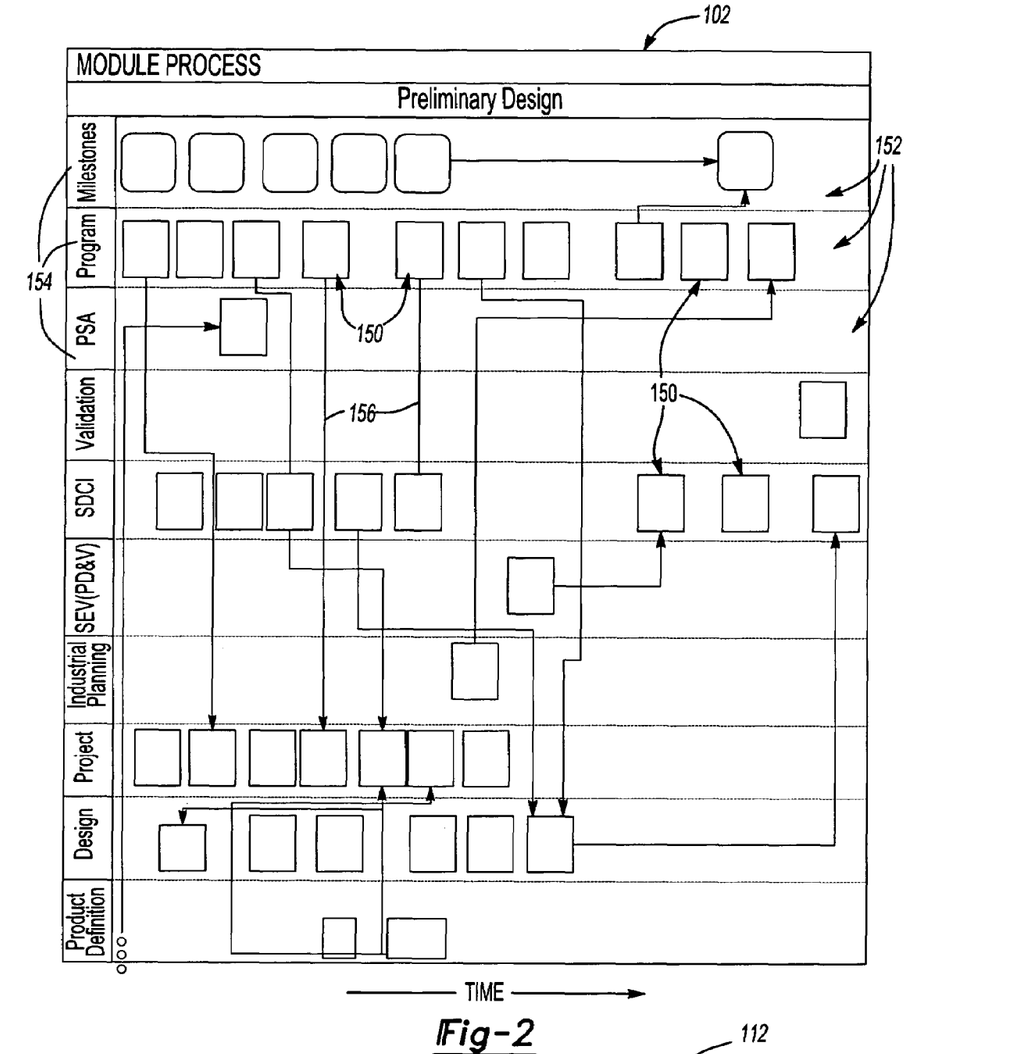
FIG. 2 is an example of a workflow map containing interrelated activities grouped into functional swimlanes according to one embodiment of the invention.

Referring to FIGS. 1 and 2 in more detail, the primary feature that drives the overall project is workflow maps 102 with activity blocks, which provide detailed, easily accessible information within the framework 100 about the project. The activity blocks in the workflow map 102 are clustered into functional "swimlanes" to assign ownership of the activities to different groups. A formal sign-off process may also be incorporated. These aspects will be explained in greater detail below with respect to the remaining figures.

As shown in FIG. 1, each activity block has an associated activity page 150 that sets forth detailed information about the activity. The activity page 150 includes a link to detailed, prescriptive work instructions (FIG. 4) that describe the steps to be carried out in executing the activity as well as other elements, such as those described below, that guide execution. If the framework 100 is designed as a web-based framework, for example, these links can be in the form of hyperlinks that connect the activity page 150 to its corresponding work instructions and elements.

In addition to the workflow maps, the framework 100 includes tools and methods 104 that provide information on how to execute the activities in the map 102. In one embodiment, the tools and methods are certified to their applicability range of the design space (i.e., the range over which the tools and methods 104 are certified to work) and have robust control over different versions of design tools used in each activity to reflect and track any upgrades in the tools.

Each activity in the workflow map 102 also has design criteria 106, which are used to evaluate whether a given activity was performed successfully. Design standards 108, which reflect organizational learning and best practices, are embedded in a given activity or element along with other preferred practices such as environmental, health and safety requirements and green requirements. The tools, methods and design criteria make it easy to identify deviations from standard work.

To prevent the framework 100 from becoming a static, and therefore obsolete, model over time, the framework 100 also includes a lessons learned element 110 to incorporate information learned during, for example, inspections, reviews, product testing and product service and, if needed to modify any part of the framework 100 to reflect this new information.

The outcome of a given process is only as good as the people executing the activities in the map 102, so the framework 100 may also include a practitioner proficiency element 112 that dictates whether expert supervision and/or approval is needed for a given activity. Ownership and approval of the framework content should be in the hands of recognized experts to ensure product quality.

Each element 101 in the framework 100 may be provided with a standard template format and a standard process to control and improve content as well as ensure easy document navigation through the elements 101. Standardizing the template and process in a prescriptive manner ensures that everyone involved in the project is working from the same plan while making productivity improvement opportunities easy to identify and implement. An example of this standardization will be apparent from the examples described below and the figures.

FIG. 2 is an example of a workflow map 102 for illustrative purposes only. The workflow map 102 contains a plurality of activities 150 divided among multiple functional swimlanes 152. Each activity 150 corresponds to a task needed to carry out a project. For ease of use, the activities 150 in the workflow map 102 may be arranged physically (e.g., right to left, top to bottom, etc.) according to a time line so that the evolution of the project and the relative time periods of each of the activities 150 can be easily referenced.

Each swimlane 152 corresponds to a different functional group 154 (e.g., an organization). The activities 150 in any given lane 152 are the responsibility of the functional group 154. Thus, members of a functional group 154 can review all of the activities 150 within its associated lane 152 to determine what tasks need to be done at a given time. Clustering related activities 150 together into functional swimlanes 152 assigns ownership of the activities 150 to different organizations. The functional swimlanes 152 make it easy to determine the ownership of each activity, thereby making it easier to manage information flow and linkages between organizations for different groups of activities.

Links 156 (shown as arrows in FIG. 2) between the activities 150 indicate dependencies between various activities 150. As shown in the Figure, activities 150 may exchange information across lanes 152, and certain activities 150 may require information from activities 150 in other lanes 152 before being able to proceed. The workflow map 102 provides an easily-referenced graphical map so that people working in different functional groups will know who they need information from and who to direct information to at any given activity 150 as well as the relative times at which each activity 150 takes place. As a result, people can manage their time and coordinate inputs and outputs among the activities 150. Note that the links 156 may also indicate flow between activities 150 and external organizations rather than just between activities 150.

In one embodiment, each activity 150 may have corresponding standard resource plans 114 that outline the standard resources (e.g., cycle time, labor, hardware, consumables, etc.) needed to execute the activity. This allows each activity to be planned and resourced accordingly. The standard resource plan 114 will be described in greater detail below with respect to FIG. 6.

Figure 3:
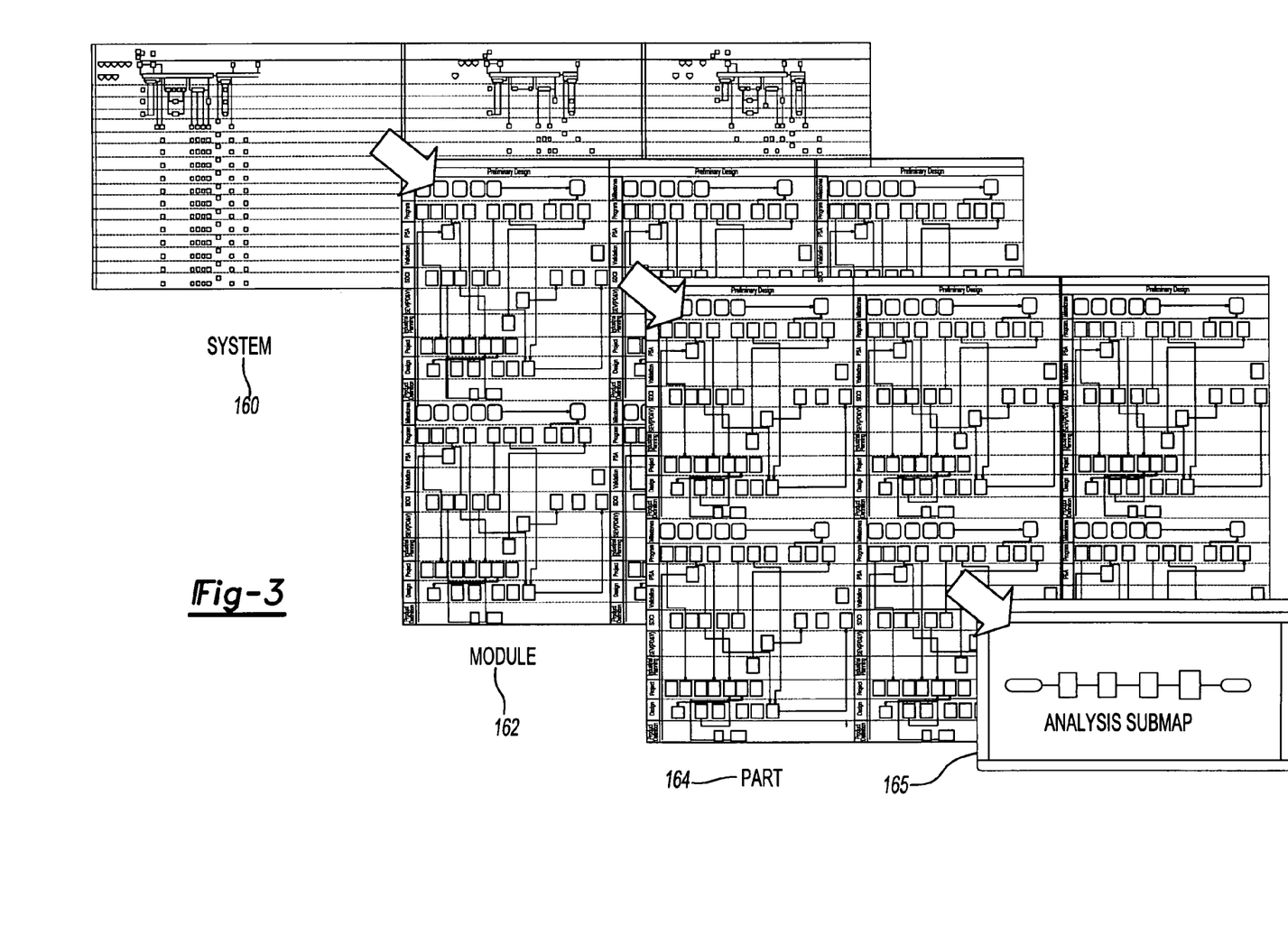
FIG. 3 is a block diagram illustrating examples of levels of workflow maps according to one embodiment of the invention.

Referring to FIG. 3, the workflow map 102 may include multiple levels of maps to provide more detailed information. In one embodiment, the workflow map 102 includes a system level map 160 that illustrates an entire project, module maps 162 that illustrate an evolution of a given module within the system, part maps 164 that illustrate an evolution of a given part within a module and, if needed, an analysis submap 165 associated with a given part. The manner in which a given system is divided into modules and parts for purposes of the framework 100 is a function of the specific system being designed and can vary without departing from the scope of the invention. For example, an engine system, may include several major components divided based on their function (e.g., burner, fan, etc.), and each of the major components in turn has their own associated parts. As a result, different people who execute activities at different levels (e.g., system, module, part) access different workflow maps, thereby focusing on the activities relevant to their particular level.

Viewing the workflow map 102 in FIG. 2 and the multiple map levels in FIG. 3 together illustrates the three-dimensional connectivity offered by the inventive framework 100. More particularly, as noted in FIG. 3, the framework 100 may include maps at the system 160, module 162, and part 164 levels as well analysis submaps 165 that may be associated with any of the system, module, and part level maps. This linking between different map levels constitutes "vertical" connectivity. Further, as shown in FIG. 2, the activities 150 in each functional swimlane 152 are connected "horizontally" as they move through various development phases (e.g., concept initiation, concept optimization, preliminary design, detailed design, validation, and service and field support). "Depth" connectivity is provided by the elements 101 shown in FIG. 1 (e.g. work instructions, tools and methods, etc.). Thus, the framework 100 offers 3-D connectivity by linking framework components in the horizontal, vertical, and depth directions.

In one embodiment, the top functional swimlane 152 in a given workflow map will show the connectivity of that map to a higher level map, if any, and the bottom swimlane 152 will show the connectivity of that map to a lower level map, if any. For example, if the given workflow map is a module level map 162, the top swimlane in the module map 162 will show how data is exchanged between the module level map 162 and the higher level system map 160, while the bottom swimlane of the module map 162 will show how data is exchanged between the module level map 162 and the part level map 164.

Note that a given activity 150 may itself be complex enough to warrant its own separate map, with its own associated activities and work instructions. The framework 100 can therefore allow maps and activities to be nested to accommodate any complex process, even if the activities 150 themselves are complex.

Figure 4:
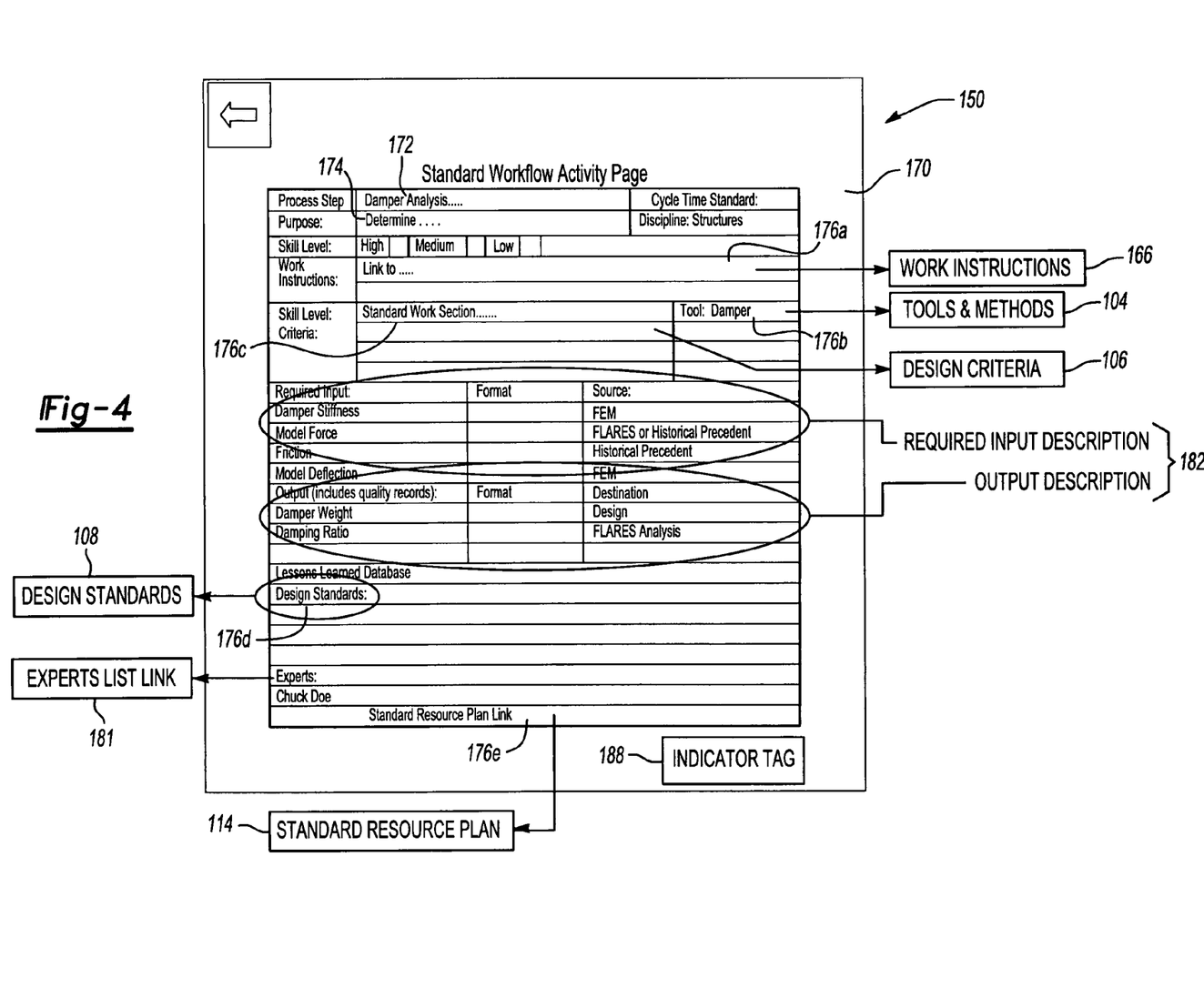
FIG. 4 is an illustrative example of an activity page template according to one embodiment of the invention.

FIG. 4 illustrates elements associated with a given activity 150 in more detail. These details are applicable to any of the maps shown in FIG. 3. As noted above, a map comprises a plurality of activities 150. The activities 150 themselves contain detailed content regarding carrying out that specific activity. Together, the workflow maps and activity blocks 150 document what needs to be done in a given process, how the activity is to be done, and the time frame for starting and completing a given activity.

In one embodiment, as shown in FIG. 4, each activity 150 is arranged as an index page 170 having a standard format and links to other information. Using a standard index page 170 format ensures that information can be easily located regardless of the specific activity 150. In one embodiment, the index page 170 includes the name of the activity/process step 172 detailed by the page 170, an activity description 174 highlighting the purpose of the activity, one or more links 176a to the work instructions 166, one or more links 176b to tools and methods 104, one or more links 176c to design criteria 106, one or more links 176d to design standards 108, and/or one or more links 176e to standard resource plans 114. In other words, the activity index page 170 pulls the work instructions 166, tools and methods 104, design criteria 106 and design standards 108 together in a centralized, easily navigated document that remains consistent throughout the framework 100.

The activity index page 170 also may include links 181 for contacting any experts related to the activity 150. This provides easy access to experts in the specific activity, saving time if any questions occur during implementation of the activity 150. The index page 170 also includes spaces 182 for documentation (e.g., required inputs from and required outputs to other activities in the process) and signoffs to share information and project status with people in other functional groups and in other stages of the overall process.

The work instructions 166 linked to the activity index page 170 can include any detailed, prescriptive work instructions needed to carry out the activity as well as links to any other information or elements 101 (e.g., tools and methods, design criteria) to be used in execution. For example, if the work instructions 166 include a step for running a given software program, the work instructions 166 may include a link to the tools and methods 104 element that has a link to that program. The work instructions 166 should be prescriptive and unambiguous enough so that any qualified engineer carrying out the instructions will generate the same results. The specific content in the work instructions 166 can vary depending on the type and amount of information needed to carry out a given activity, but the overall format of the work instructions 166 should be standardized to ensure easy document navigation.

The tools and methods 104, which are accessible via the activity index page 170, can include any information useful for carrying out a particular activity. Generally, the tools and methods 104 may include the range of applicability of the work instructions 166 and validation tools for the work instructions 166 to determine whether the standard work, as described in a given activity, is the correct way for executing the activity. The tools and methods 104 are ideally certified and verified to ensure that all activities in a given process have a uniform level of analysis. The instructions themselves can cover any activity and can involve any type of action such as, for example, collecting and reformatting data, viewing charts, data analysis, etc.

As noted above, particular work instructions may be applicable only during specific stages of the development process. This is because some activities, such as detailed design, should not be implemented before a given technology is mature enough to handle it to avoid costly turnbacks and unnecessary iterations. Thus, the work instructions in the tools and methods 104 may be assigned a technology readiness level (TRL) value (e.g., a number from 1 to 6), which reflects the maturity of new technologies. In one embodiment, the minimum technology readiness level for a given activity corresponds with a development stage (e.g., concept initiation, concept optimization, preliminary design, detailed design, etc.), preventing technologies below a certain level of readiness from being used past a certain point in the development process. Thus, for example, work instructions may be required to reach a TRL value of 6 before they can even be included in the work instructions 166, preventing those instructions from being implemented prematurely. By evaluating an activity for technology readiness, the invention keeps technology development and product development separate, ensuring that a given technology is mature and past the conceptual stage before entering the product development process.

Once a practitioner has executed the work instructions in the tools and methods 104, the outcome of the execution is evaluated against explicitly defined and validated design criteria 106, which are included in the activity 150. The design criteria 106 are used to evaluate whether a given work instruction has been carried out successfully. This is to ensure that any outputs from the work instructions are usable by other activities in the process. If the outcome of a given set of work instructions fails to meet the design criteria, work flow does not proceed unless a practitioner with the requisite authorization grants deviation from the standard work and places an appropriate risk mitigation plan in place in view of the deviation before proceeding to the next activity in the workflow map. Failure to meet the design criteria may indicate either that the work instructions 166 for that activity 150 have not been correctly executed or that the design criteria are flawed and need to be updated. Regardless of the reason for the deviation from the standard work instructions, proper authorization and documentation of the deviation should be recorded in the activity index page 170 to notify other users that a deviation was used to complete the activity.

A user may also check any previous activities to ensure that they were conducted correctly and met their own design criteria. The design criteria 106 may also describe the underlying logic and physics of the design addressed by a given activity and the basis for specific numeric values in the criteria used to evaluate the acceptability of a design.

In one embodiment, the index page 170 includes a tag 188 that changes color when acceptable inputs are entered with respect to the design criteria and, depending on the proficiency of the engineer entering the results, approved to indicate the successful completion of the activity. For example, the tag 188 may be colored red if the activity is incomplete, yellow if the activity is completed and waiting for approval, and green if the activity is successfully completed. Once the activity is completed, the results are documented in an activity log (not shown) associated with the activity page 170 so that others can examine the results in more detail.

A given activity may also have associated design standards 108 that describe preferred methods, configurations, preferred manufacturing processes, preferred sources for product procurement, environmental issues, technical issues, etc. gleaned from experience. The design standards 108 for a given activity 150 provides a starting point for carrying out activity by providing information on what has been successful in the past. The design standards 108 provides the basis for integrating design and execution (e.g., engineering and manufacturing) so that ultimately any designs arising from the framework 100 will be, by definition, producible. Thus, the design standards 108 provide a framework for innovations to ensure that any improvements in a design have a high likelihood of being successful. The design standards 108 may also include a list of owners and/or experts related to that activity 150 to provide experiences contacts for any questions that may arise.

In one embodiment, a design standards template may be used to generate the design standards element 108. Generally, the design standards 108 provide a template for a given part by indicating preferred practices and standards, such as preferred configurations, materials, manufacturing and assembly processes, etc. The design standards 108 therefore reflect organization learning and best practices for any element in the framework 100. The design standards 108 themselves may be embedded in any activity 150 and element 101 where the design standards 108 would be relevant.

To ensure that the framework 100 reflects improvements in tools, methodologies, work instructions, etc., the lessons learned element 110 provides an explicit mechanism for handling continuous improvement issues. Generally, the lessons learned element 110 is a closed loop process to document any information that would be helpful for improving future projects. The lessons learned element 110 may, for example, include details on any revisions made to any part of the framework 100, including the date and type of revision, the date the revision was initiated and completed, the owner of the activity in which the revision was made, and the functional group in which the revision was made.

The framework 100 recognizes that variations in the skills of engineers carrying out the activities 150 may introduce inconsistencies in the results of the process. To minimize this, the practitioner proficiency element 112 provides a way to categorize engineers of varying skill levels. This improves efficiency by allowing any practitioner at a given skill level, instead of a specific designated person, to review and approve a given activity 150 as soon as it is completed. This prevents bottlenecks during the review and approval process, ensuring that work is reviewed and approved on a continuous basis to keep the process flow running smoothly.

Incorporating a formal review and sign-off process for each activity ensures that each activity was performed according to the standard laid out in the prescriptive work instructions. Moreover, if the activity was performed by a practitioner having a proficiency level below the level required for a given activity, the formal process includes a way for the activity performance to be reviewed and approved by someone at a higher proficiency level to check for correct execution. Integrating the review and sign-off process in the framework 100 ensures in-process quality by allowing anyone having a higher proficiency level to review and approve activity execution with respect to standard work. Thus, the formal sign-off process prevents review bottlenecks from occurring in the process.

Figure 5:
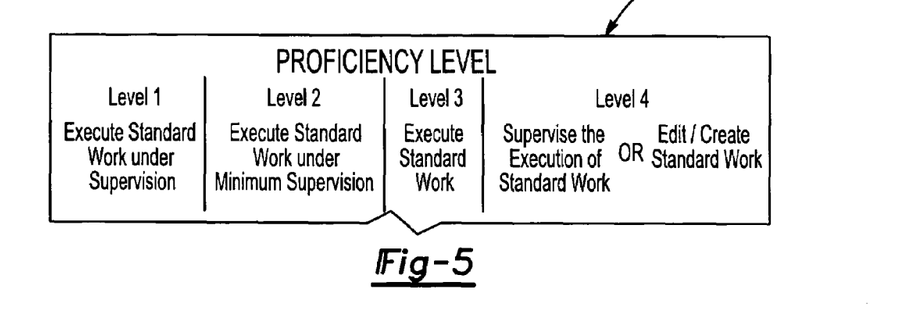
FIG. 5 is an illustrative example of proficiency levels that may be incorporated as proficiency requirements in the system.

FIG. 5 illustrates a proposed practitioner proficiency element 112 in more detail. In this embodiment, engineers are classified according to four levels that dictate how much supervision the engineer needs when executing activities 150 in the framework 100. Level 1 allows an engineer to execute work under supervision of a engineer at a higher level;

approval of the work must be conducted by a higher level engineer. Level 2 allows an engineer to work with minimal supervision. Level 3 allows an engineer to execute work with no supervision and also allows the engineer to approve his or her own work. Level 4 allows an engineer to supervise execution of work or edit/create standard work as well as develop curricula for training engineers at lower levels. Engineers at a given level are also able to mentor engineers at lower levels. The levels themselves are assigned based on, for example, the amount of training the engineer has, demonstrated abilities in previous work, and other skill-based and experience-based criteria.

Assigning engineers to various proficiency levels and incorporating appropriate approvals and supervision within the framework 100 ensures flawless execution of the activities 150 within the framework 100. Thus, the framework 100 combines tight controls on both the development process embodied in the framework 100 as well as the people executing the process. In one embodiment, the proficiency levels are aligned with the functional swimlanes 152 so that no activity can be executed by a practitioner if they do not have an assigned proficiency in the function associated with that particular swimlane 152. In other words, a proficiency level in one functional swimlane does not carry over to other swimlanes. Thus, the proficiency level reflects the skills associated with a specific function and that proficiency in other functions require additional training and experience in those other functions. This ensures high quality by limiting activity execution in a given functional swimlane to practitioners with demonstrated ability in that specific function.

Figure 6:
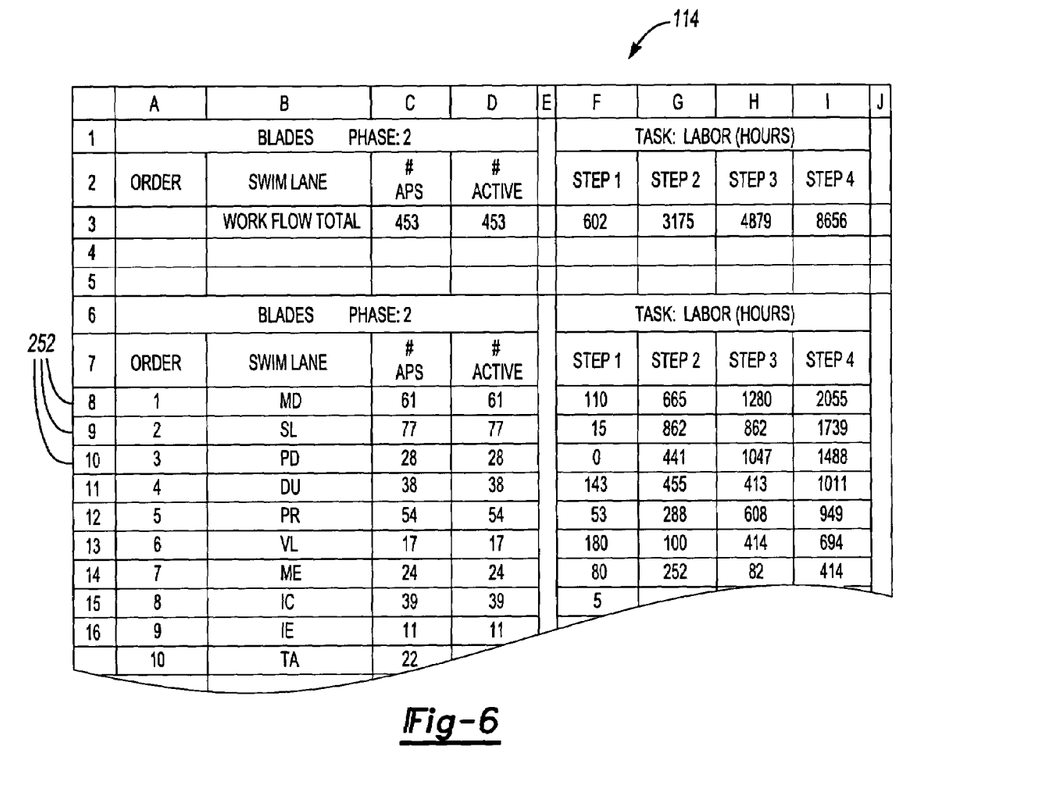
FIG. 6 is an illustrative example of a standard resource plan to be used in the framework.

This framework 100 not only provides a rigorous process for program execution, but also an equally rigorous process for project planning, including budgets. FIG. 6 illustrates a standard resource plan 114 that may be associated with a given workflow map (e.g., a part map 164). In one embodiment, each part, and therefore each part map 164, is given a separate standard resource plan 114, and each activity 150 within the part map 164 has a corresponding row 252 on the standard resource plan 114.

The standard resource plan 114 generally describes the basis for a resource plan for a given activity or part. The standard resource plan 114 acts as a central location for documenting any variables that can affect resource requirements in a given activity 150 (e.g., staffing levels, standard cycle times, standard materials, hardware, consumables costs at the system module and part levels, etc.). As activities 150 are completed, the actual resource requirements are entered into their corresponding rows 252 on the standard resource plan 114. This actual data provides concrete information for updating the standard resource plan 150 and conduct more accurate capacity planning based on actual experience. The standard resource plan 114 also acts as a reference point for future projects to generate rigorous estimates of new projects.

For example, if a new turbine is to be designed with a larger blade than previously known turbines, the standard resource plan 114 can be used to generate a rigorous estimate of material and labor costs because it contains a basis for the previous estimates as well as any actual accruals. By knowing the size difference between the old turbine blade and the new blade to be designed, it is possible to scale the basis of the previous estimates based on any differentials (e.g., differences in cost, time, materials, labor, complexity, etc.) in the new design to generate a rigorous estimate for new blade. By providing the basis of old estimates, the standard resource plan 114 eliminates the need to generate estimates from scratch.

Implementing the above-described embodiment of the invention via a web-based system makes it possible to collect data in the standard resource plan 114 as work is completed and identify productivity improvement opportunities. For example, the actual cycle times and costs of a given activity are recorded in the standard resource plan 114 and provide information that highlights where, for example, the process is falling behind schedule or exceeding cost targets as soon as it happens. As a result, corrective action can be taken early and based on real data due to the amount of detail in the standard resource plan 114. Without the amount of detail and accessibility provided by the standard resource plan 114, it would be impossible to estimate the resources required to execute a given activity with any degree of accuracy. The invention therefore provides a way to continually update and align the standard resource plans 114 with actual accruals, thereby improving the fidelity of the resource plan.

By constructing a detailed flow map of functional groups, their associated activities, and the dependences between activities, the flow map provides an easily-understood visual map of the entire process and adds robust connectivity between activities as well as the functional groups and people conducting those activities. Further, incorporating tools and methods, design criteria, design standards, lessons learned, practitioner proficiency requirements, and standard resource plans into the system adds more robust controls over each stage of the project and ensures that project efforts are directed to continuous improvement on producible and manufacturable designs by the most qualified people. Combining workflow maps with standard, prescriptive instructions and qualified practitioner sign-offs creates in-process quality control throughout the product development process.

As a result, the inventive system makes improvements easy to identify and implement and provides a common framework for everyone involved in a given project to reference. This process-focused approach can greatly reduce development costs by reducing design efficiencies while at the same time making continuous improvement simple and reliable to implement. Thus, the above described embodiment of the invention standardizes work in areas where improvement has already been made, relying on previously successful work, while at the same time offering enough flexibility in the areas that require creativity to deliver improved results. Note that the concepts described above can be used in many different applications and is not limited to the embodiments described above.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A project management method, comprising:
   generating at least one workflow map comprising a plurality of maps arranged in a hierarchy containing a plurality of levels and containing a plurality of activity blocks, each activity block corresponding to an activity in a project;
   linking the plurality of activity blocks with links corresponding to dependencies between activity blocks;
   dividing said plurality of activity blocks into at least two functional swimlanes corresponding to at least two functional groups;
   associating at least one of a work instruction, a tools and methods element, a design criteria element, a design standards element, a lessons learned element, and a practitioner proficiency element with each activity; and generating a user interface to provide user interactivity with said at least one workflow map;

wherein the plurality of maps comprises at least one of a system map, module map, part map, and analysis submap, wherein the system map, module map, part map, and analysis submap are arranged in the hierarchy such that the system map links to at least one module map, and the module map links to at least one part map; and wherein the step of generating said at least one workflow map further comprises at least one analysis submap that is linked to at least one of the system map, the part map, and the module map.

2. The method of claim 1, further comprising showing a data exchange with a higher level map via a top functional swimlane.

3. The method of claim 1, further comprising showing a data exchange with a lower level map via a bottom functional swimlane.

4. The method of claim 1, further comprising:

generating an activity index page corresponding to each activity; and generating links in the activity index page to information corresponding to said at least one of the work instructions, tools and methods element, design criteria element, design standards element, lessons learned element, and practitioner proficiency element.

5. The method of claim 4, wherein the activity index page further comprises at least one space for documenting work results and a tag that changes color when the work results are acceptable as defined by the design criteria element.

6. The method of claim 1, wherein the design criteria element comprises numeric values used to evaluate the acceptability of work conducted in the activity.

7. The method of claim 1, wherein the design standards element includes at least one of a preferred method, configuration, process, source, and issue for carrying out the activity.

8. The method of claim 1, wherein the practitioner proficiency element comprises categorizing a plurality of skill levels, each skill level reflecting a degree of supervision for work in a given activity.

9. The method of claim 1, wherein the practitioner proficiency element is aligned with one of said functional swimlanes to indicate proficiency in a function associated with that functional swimlane.

10. The method of claim 1, further comprising generating a standard resource plan for documenting resource requirements in an activity.

11. The method of claim 10, further comprising:
comparing actual accruals with estimated resource requirements in the standard resource plan; and
updating the standard resource plan based on the actual accruals.

* * * * *